United States Patent
Sampsell et al.

(10) Patent No.: US 7,672,035 B2
(45) Date of Patent: *Mar. 2, 2010

(54) SEPARABLE MODULATOR

(75) Inventors: Jeffrey B. Sampsell, Pueblo West, CO (US); Mark W. Miles, Atlanta, GA (US); Clarence Chui, San Jose, CA (US); Manish Kothari, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/325,964

(22) Filed: Dec. 1, 2008

(65) Prior Publication Data

US 2009/0080060 A1 Mar. 26, 2009

Related U.S. Application Data

(60) Continuation of application No. 10/644,312, filed on Aug. 19, 2003, now Pat. No. 7,460,291, which is a continuation-in-part of application No. 10/078,282, filed on Feb. 19, 2002, now Pat. No. 7,042,643, which is a division of application No. 09/991,378, filed on Nov. 21, 2001, which is a continuation of application No. 08/769,947, filed on Dec. 19, 1996, now abandoned.

(51) Int. Cl.
*G02B 26/00* (2006.01)

(52) U.S. Cl. ...................... 359/291; 359/290

(58) Field of Classification Search .......... 359/291, 359/290, 224, 223, 297, 298

See application file for complete search history.

(56) References Cited

U.S. PATENT DOCUMENTS

| 2,534,846 | A | 12/1950 | Ambrose et al. |
| 3,184,600 | A | 5/1965 | Potter |
| 3,371,345 | A | 2/1968 | Lewis |
| 3,410,363 | A | 11/1968 | Schwartz |
| 3,661,461 | A | 5/1972 | Dessauer |
| 3,728,030 | A | 4/1973 | Hawes |
| 3,746,785 | A | 7/1973 | Goodrich |
| 3,955,190 | A | 5/1976 | Teraishi |
| 4,215,244 | A | 7/1980 | Gutleber |
| 4,347,983 | A | 9/1982 | Bodai |
| 4,403,248 | A | 9/1983 | te Velde |
| 4,441,791 | A | 4/1984 | Hornbeck |
| 4,786,128 | A | 11/1988 | Birnbach |

(Continued)

OTHER PUBLICATIONS

Bass, "Handbook of Optics, vol. I, Fundamentals, Techniques, and Design, Second Edition," McGraw-Hill, Inc., New York, pp. 2.29-2.36 (1995).

(Continued)

*Primary Examiner*—Timothy J Thompson
(74) *Attorney, Agent, or Firm*—Knobbe Martens Olson & Bear LLP

(57) ABSTRACT

A separable modulator architecture is disclosed. The modulator has a mirror suspended from a flexible layer over a cavity. The flexible layer also forms supports and support posts for the mirror. An alternative separable modulator architecture has a mirror suspended over a cavity. The modulator is supported by supports and support posts. The support posts comprise a flexible layer over support post plugs. A bus structure may be formed upon the flexible layer arranged over the support posts.

29 Claims, 11 Drawing Sheets

U.S. PATENT DOCUMENTS

| | | | |
|---|---|---|---|
| 4,859,060 A | 8/1989 | Katagiri et al. |
| 4,863,245 A | 9/1989 | Roxlo |
| 4,954,789 A | 9/1990 | Sampsell |
| 4,956,619 A | 9/1990 | Hornbeck |
| 4,965,562 A | 10/1990 | Verhulst |
| 4,982,184 A | 1/1991 | Kirkwood |
| 5,022,745 A | 6/1991 | Zayhowski et al. |
| 5,028,939 A | 7/1991 | Hornbeck et al. |
| 5,044,736 A | 9/1991 | Jaskie et al. |
| 5,091,983 A | 2/1992 | Lukosz |
| 5,096,279 A | 3/1992 | Hornbeck et al. |
| 5,126,836 A | 6/1992 | Um |
| 5,148,157 A | 9/1992 | Florence |
| 5,170,283 A | 12/1992 | O'Brien et al. |
| 5,185,660 A | 2/1993 | Um |
| 5,293,272 A | 3/1994 | Jannson et al. |
| 5,311,360 A | 5/1994 | Bloom et al. |
| 5,315,370 A | 5/1994 | Bulow |
| 5,353,114 A | 10/1994 | Hansen |
| 5,355,357 A | 10/1994 | Yamamori et al. |
| 5,361,383 A | 11/1994 | Chang et al. |
| 5,381,232 A | 1/1995 | Van Wijk |
| 5,450,205 A | 9/1995 | Sawin |
| 5,452,138 A | 9/1995 | Mignardi et al. |
| 5,471,341 A | 11/1995 | Warde et al. |
| 5,500,635 A | 3/1996 | Mott |
| 5,526,172 A | 6/1996 | Kanack |
| 5,526,327 A | 6/1996 | Cordova, Jr. |
| 5,528,707 A | 6/1996 | Sullivan et al. |
| 5,559,358 A | 9/1996 | Burns et al. |
| 5,580,144 A | 12/1996 | Stroomer |
| 5,636,052 A | 6/1997 | Arney et al. |
| 5,646,729 A | 7/1997 | Koskinen et al. |
| 5,646,768 A | 7/1997 | Kaeriyama |
| 5,661,592 A | 8/1997 | Bornstein et al. |
| 5,665,997 A | 9/1997 | Weaver et al. |
| 5,710,656 A | 1/1998 | Goossen |
| 5,818,095 A | 10/1998 | Sampsell |
| 5,825,528 A | 10/1998 | Goossen |
| 5,835,255 A | 11/1998 | Miles |
| 5,838,484 A | 11/1998 | Goossen et al. |
| 5,867,301 A | 2/1999 | Engle |
| 5,920,418 A | 7/1999 | Shiono et al. |
| 5,986,796 A | 11/1999 | Miles |
| 6,040,937 A | 3/2000 | Miles |
| 6,674,562 B1 | 1/2004 | Miles et al. |
| 6,710,908 B2 | 3/2004 | Miles et al. |
| 6,782,240 B1 | 8/2004 | Tabe |
| 7,123,216 B1 | 10/2006 | Miles |
| 7,126,738 B2 | 10/2006 | Miles |
| 7,372,619 B2 | 5/2008 | Miles |
| 7,460,291 B2 * | 12/2008 | Sampsell et al. ............ 359/291 |
| 2004/0240032 A1 | 12/2004 | Miles |
| 2007/0020948 A1 * | 1/2007 | Piehl et al. .................. 438/761 |
| 2008/0037093 A1 | 2/2008 | Miles |
| 2008/0088904 A1 | 4/2008 | Miles |
| 2008/0088910 A1 | 4/2008 | Miles |
| 2008/0088911 A1 | 4/2008 | Miles |
| 2008/0088912 A1 | 4/2008 | Miles |
| 2008/0106782 A1 | 5/2008 | Miles |

OTHER PUBLICATIONS

Conner, "Hybrid Color Display Using Optical Interference Filter Array," SID Digest, pp. 577-580 (1993).
Jerman et al., "A Miniature Fabry-Perot Interferometer with a Corrugated Silicon Diaphragm Support", (1988).
Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. Conf. 6, Jun. 24, 1991, pp. 372-375.
Office Action dated Apr. 20, 2004 for U.S. Appl. No. 09/991,378.
Office Action dated Jul. 27, 2004 for U.S. Appl. No. 10/078,282.
Office Action dated Nov. 25, 2002 in U.S. Appl. No. 10/078,282.
Office Action dated Jun. 19, 2006 in U.S. Appl. No. 10/844,802.
Office Action dated Aug. 14, 2002 in U.S. Appl. No. 09/974,544.
Office Action in Chinese App. No. 200480026765.7.
ISR and WO for PCT/US04/026458 filed Aug. 12, 2004.
IPRP for PCT/US04/026458 filed Aug. 12, 2004.
Pape et al. Characteristics of the deformable mirror device for optical information processing, Optical Engineering, 22(6):676-681, Nov.-Dec. 1983.
Office Action dated Jun. 11, 2008 for U.S. Appl. No. 09/991,378.
Office Action dated Jul. 14, 2008 in U.S. Appl. No. 11/868,414.
Office Action dated Dec. 3, 2008 in U.S. Appl. No. 11/868,414.
Office Action in Chinese App. No. 200480026765.7.
Notice of Reasons for Rejection dated Oct. 28, 2008 in Japanese App. No. 2005-518934.
Office Action dated Nov. 30, 2006 for U.S. Appl. No. 09/991,378.
Office Action dated Apr. 16, 2009 in U.S. Appl. No. 11/686,414.
Longhurst, 1963, Chapter IX: Multiple Beam Interferometry, in Geometrical and Physical Optics, pp. 153-157.
Tolansky, 1948, Chapter II: Multiple-Beam Interference, in Multiple-bean Interferometry of Surfaces and Films, Oxford at the Clarendon Press, pp. 8-11.
Decision of Rejection in Chinese App. No. 200480026765.7.

* cited by examiner

US 7,672,035 B2

SEPARABLE MODULATOR

CROSS-REFERENCE TO RELATED APPLICATIONS

This application is a continuation of U.S. patent application Ser. No. 10/644,312, filed Aug. 19, 2003, which is a continuation-in-part of U.S. patent application Ser. No. 10/078,282, filed Feb. 19, 2002, now U.S. Pat. No. 7,042,643, which is a divisional of U.S. patent application Ser. No. 09/991,378 filed on Nov. 21, 2001, which is a continuation of U.S. patent application Ser. No. 08/769,947 filed on Dec. 19, 1996, now abandoned.

BACKGROUND OF THE INVENTION

Spatial light modulators used for imaging applications come in many different forms. Transmissive liquid crystal device (LCD) modulators modulate light by controlling the twist and/or alignment of crystalline materials to block or pass light. Reflective spatial light modulators exploit various physical effects to control the amount of light reflected to the imaging surface. Examples of such reflective modulators include reflective LCDs, and digital micromirror devices (DMD™).

Another example of a spatial light modulator is an interferometric modulator that modulates light by interference, such as the iMoD™. The iMoD employs a cavity having at least one movable or deflectable wall. As the wall, typically comprised at least partly of metal, moves towards a front surface of the cavity, interference occurs that affects the color of light viewed at the front surface. The front surface is typically the surface where the image seen by the viewer appears, as the iMoD is a direct-view device.

Currently, iMoDs are constructed of membranes formed over supports, the supports defining individual mechanical elements that comprise the picture elements (pixels) of an image. In a monochrome display, such as a display that switches between black and white, one iMoD element might correspond to one pixel. In a color display, three iMoD elements may make up each pixel, one each for red, green and blue.

The individual iMoD elements are controlled separately to produce the desired pixel reflectivity. Typically, a voltage is applied to the movable wall of the cavity, causing it to be electrostatically attracted to the front surface that in turn affects the color of the pixel seen by the viewer. Since the iMoD is based upon a membrane, however, some objectionable artifacts may occur around the edges of the elements. As the membrane deflects or deforms towards the front surface, it typically does not achieve a uniform flatness. The portions of the membrane that curve away from the fully-deformed membrane held tightly against the front surface are at differing distances away from the front surface, which may result in the objectionable artifacts.

Since the iMoD typically functions as a direct-view device, the back surface of the movable portion of the cavities may be operated upon without negatively affecting the image quality. This may also provide more freedom in other aspects of the manufacture of these devices

SUMMARY OF THE INVENTION

One embodiment of the invention is a separable modulator architecture. The modulator has a mirror suspended from a flexible layer over a cavity. The flexible layer may also form supports and support posts for the mirror.

An alternative embodiment of the separable modulator architecture has a mirror suspended over a cavity. The mirror is supported by a flexible layer, supports and support posts. The flexible layer forms the supports and rests on top of the support posts. In this embodiment, the support posts are fabricated separately from the flexible layer.

In yet another alternative embodiment, a bus structure is formed above the flexible layer. The bus structure is arranged so as to electrically connect to, and be physically supported by, all of or a subset of the support posts.

BRIEF DESCRIPTION OF THE DRAWINGS

The invention may be best understood by reading the disclosure with reference to the drawings, wherein.

DETAILED DESCRIPTION OF THE PREFERRED EMBODIMENT

Figure 1:
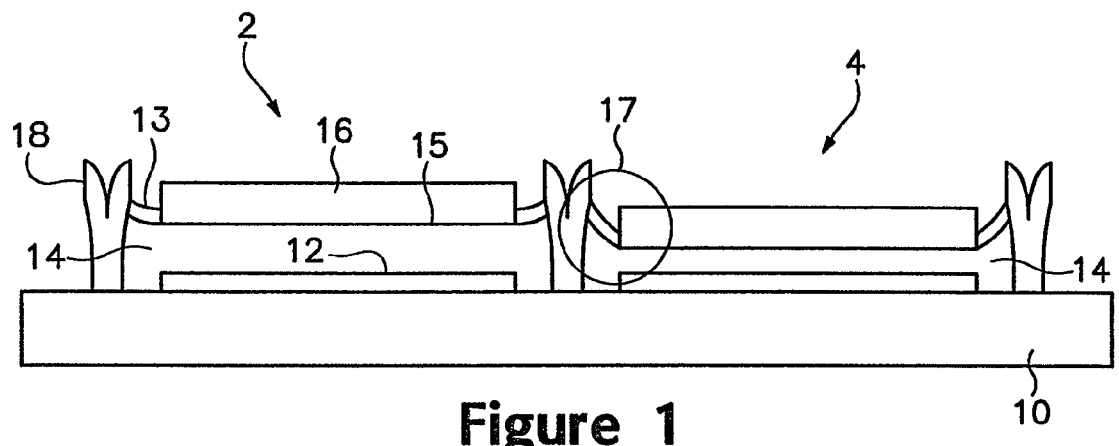
FIG. 1 shows an embodiment of an interferometric modulator.

FIG. 1 shows a side view of an interferometric modulator. The modulator 2 is arranged on a transparent substrate 10, which is typically glass. A primary mirror 12 is arranged on top of an electrode that allows for addressing of individual elements of an array of interferometric modulators. Suspended above a cavity 14 is a secondary mirror 16, which rests upon, or is part of, a membrane 15. Support arms such as 13 may be part of the same layer as the membrane 15, support the mirror 16 and attach it to the support posts 18. The support arms and the membrane 15 are flexible. This allows the secondary mirror 16 to be moved into the cavity 14, bringing it closer to the primary mirror and thereby affecting the interference properties of the cavity.

Generally, the secondary mirror assumes a quiescent state in which it is away from the primary mirror, which may also be referred to as the 'white' state or the far position. It must be understood that the "white," or ON, state may be any discrete color other than white. Any pixel made up of a number of individual colored elements, such as red, green and blue, may appear white to the viewer as will be discussed in more detail below.

When the two mirrors are separated, the resulting pixel in the image appears white or ON. When a voltage is applied to one or the other mirror, an electrostatic potential builds in the cavity and it draws the secondary mirror towards the primary mirror. The movement of the mirror changes the dimensions of the cavity. In a "near" position, the interference effects cause the resulting pixel to be black, in a monochrome system. Alternatively, the near position could cause the interference to result in other colors of light, such as red, green and blue, as will be discussed further.

Changing the interference properties of the cavity 14 allows the image viewed from the front side of the transparent substrate 10, the side opposite to that upon which the modulator is arranged, to change. For example, a picture element (pixel) corresponding to the interferometric modulator element 4 may show up as a black pixel, if the image being viewed on the front surface were monochrome. For color images, there may be three interferometric modulator elements for each pixel viewed on the front. This will be discussed in more detail later.

As can be seen in element 4 of FIG. 1, there is an area 17 where the curve of the support arm may cause a varying distance between the primary mirror and the secondary mirror. This varying distance may in turn affect the interference properties of the cavity around the edges of the observed pixels. It is possible to suspend the secondary mirror from a back support to alleviate this problem.

Figure 2:
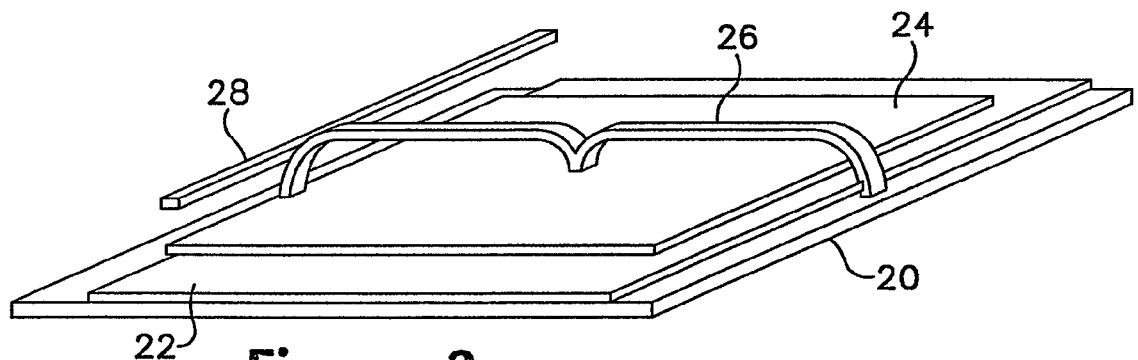
FIG. 2 shows an alternative embodiment of an interferometric modulator.

As can be seen in FIG. 2, the secondary mirror 24 is suspended over the primary mirror 22 by a back support 26. The substrate 20 is a transmissive substrate, such as glass as well. The configuration shown in FIG. 2 may provide better control of the fringe effect that occurs in configurations such as FIG. 1. In addition, the elevated line 28 may provide an opportunity to position the control interconnections away from the substrate, thereby increasing the available active area for pixels on the transmissive substrate.

Figure 3:
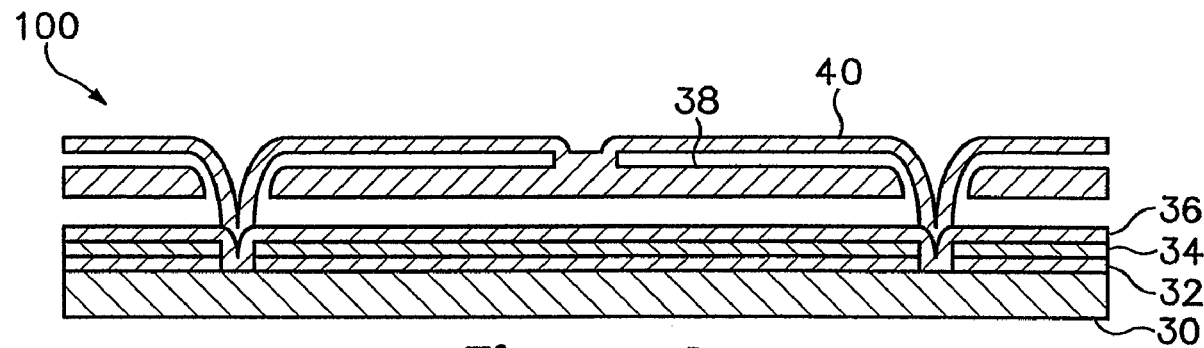
FIG. 3 shows a cross-sectional view of an interferometric modulator.
Figure 4:
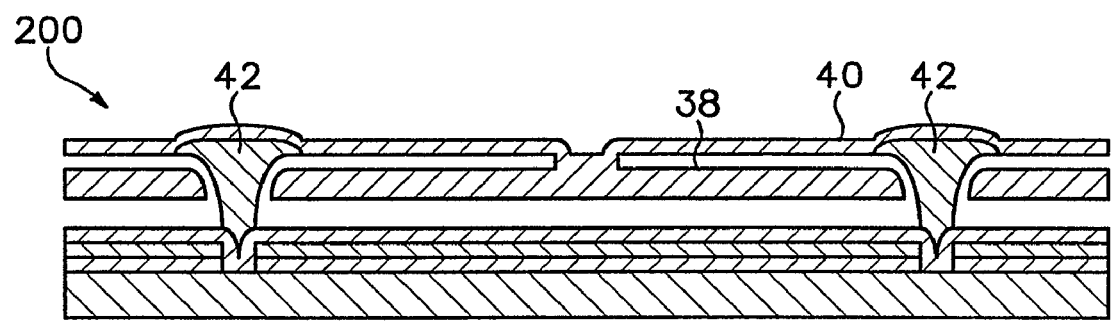
FIG. 4 shows a cross-sectional view of another embodiment of an interferometric modulator.
Figure 5:
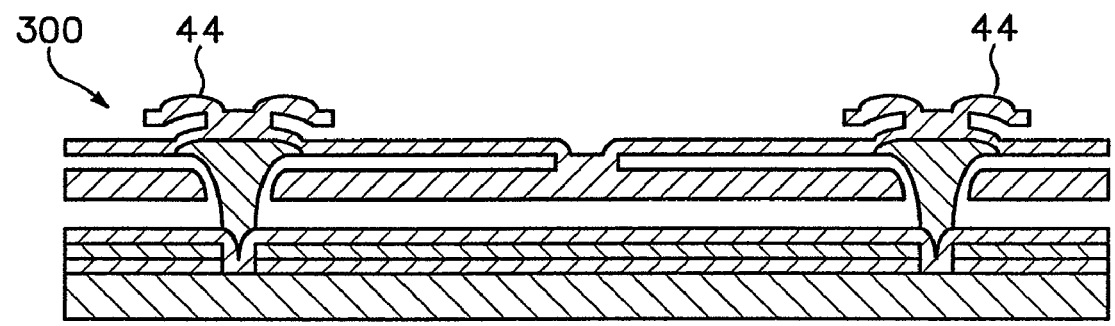
FIG. 5 shows a cross-sectional view of an embodiment of an interferometric modulator having address bussing behind a flex layer.

Cross-sectional views of alternative embodiments of interferometric modulators that provide better performance than the current implementations are shown in FIGS. 3, 4 and 5. In FIG. 3, modulator 100 comprises a mirror 38 suspended over a cavity by a membrane 40. The glass substrate 30 has formed upon it an electrode layer 32, and an optical stack formed of a metal layer, such as chrome, 34 and an oxide layer 36. In this embodiment, membrane 40, which may be a flexible metal and therefore referred to here as the flex layer, comes into contact with the optical stack layers forming support posts.

In contrast, modulator 200 of FIG. 4 has support post plugs such as 42, upon which the flex layer 40 rests. The mirror 38 remains suspended over the cavity as in the previous modulator, but the flex layer does not form the support posts by filling holes between the flex layer and the optical stack. Rather, the support posts are formed of a planarization material, as will be discussed in more detail later.

In FIG. 5, yet another embodiment of the interferometric elements is shown. This particular embodiment of modulator 300 is based upon the modulator 200 of FIG. 4, but may be adapted to work with either of the embodiments 100 or 200, as well as other configurations of the interferometric modulators. In the embodiment 300, an extra layer of metal or other conductive material has been used to form a bus structure 44. This will allow signal routing along the back of the interferometric modulators, possibility eliminating a number of electrodes that may otherwise have had to be formed on the glass substrate.

Figure 6A:
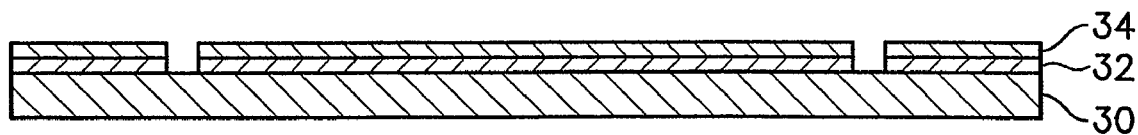
FIGS. 6a-6g show cross-sectional views of a modulator throughout the early steps of an embodiment of a process to manufacture interferometric modulators.

The modulators 100, 200 and 300 have different configurations, but have some processing steps in common. The initial processes used to form the various configurations are shown in FIGS. 6a-6g. FIG. 6a shows the formation of an electrode layer 32 out of an appropriate material, such as indium tin oxide (ITO), and an optical stack layer of metal 34 such as chrome. These materials are formed on a transparent substrate 30. The viewing surface of the transparent substrate is on the 'bottom' of the substrate, the opposite side of the substrate than that upon which the electrode and optical stack layers are formed. In a process not shown here, the electrode and metal layers 32 and 34 are patterned and etched to form electrode columns, rows or other useful shapes as required by the display design.

Figure 6B:
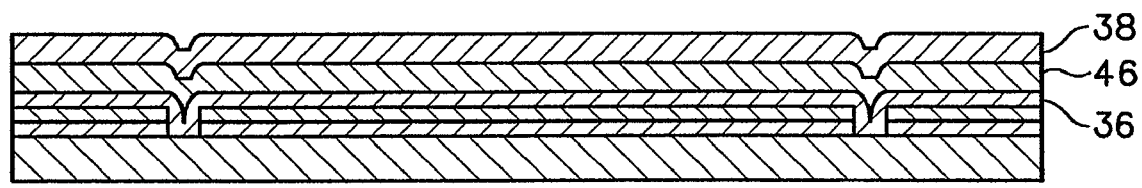
Figure 6C:
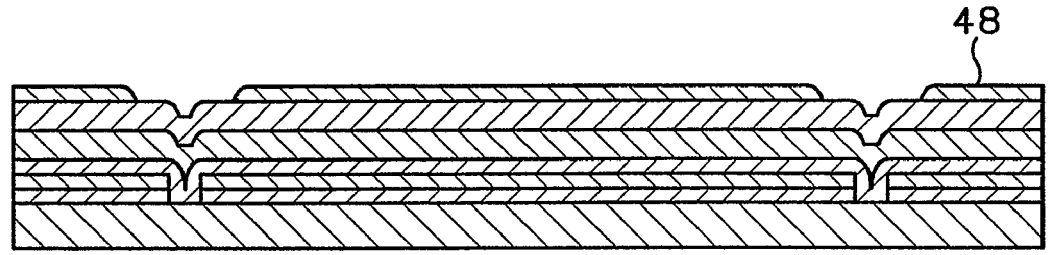

Formed on top of the metal layer 32 and filling in the gaps between the patterned electrode elements are an oxide layer 36, a first sacrificial layer 46 and the mirror metal layer 38 in FIG. 6b. The first sacrificial layer 46 will determine the dimension of the cavity over which the mirror is suspended. As discussed above, color modulators may be formed by using three modulator elements for each pixel in the resultant image. In interferometric modulators, the dimension of the cavity determines the nature of the interference. As discussed previously, moving the mirror fully towards the optical stack in a monochrome implementation causes a 'colored' pixel to turn 'black.' Similarly, moving the mirror partially towards the optical stack may result in the pixel color changing to values different from the quiescent color value.

One method of forming color pixels is to construct cavities of differing depths such that the resultant quiescent colors from three different depths of cavities are red, green and blue. The interference properties of the cavities are directly affected by their depth. In order to affect these varying cavity dimensions, three layers of sacrificial layer 46 may be deposited. A first layer will be deposited, masked and patterned thus defining the area of one of the three modulators forming each pixel; a second layer would then be deposited. A second mask would then be applied to this layer, and it would be patterned to define the combined area of the first modulator defined above as well as the second modulator forming each pixel. Finally, a third sacrificial layer would be applied. This third layer need not be patterned, since its thickness will be included in all three of the modulators forming each pixel.

The three individual deposited layers described here would not necessarily be of the same thickness. This would result in one modulator for each pixel having a thickness combined of three layers, one modulator having a thickness combined of two layers, and one modulator having a thickness of a single sacrificial layer. When the sacrificial layer materials are removed, the cavity dimensions will vary according to the various combined thicknesses of the three sacrificial layers, resulting in three different colors such as red, green and blue.

Figure 6D:
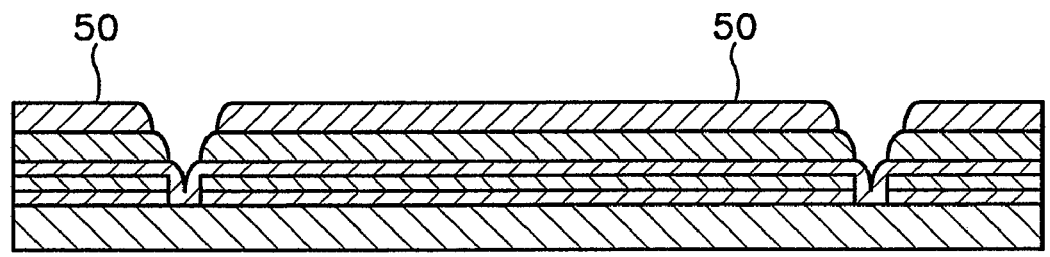
Figure 6E:
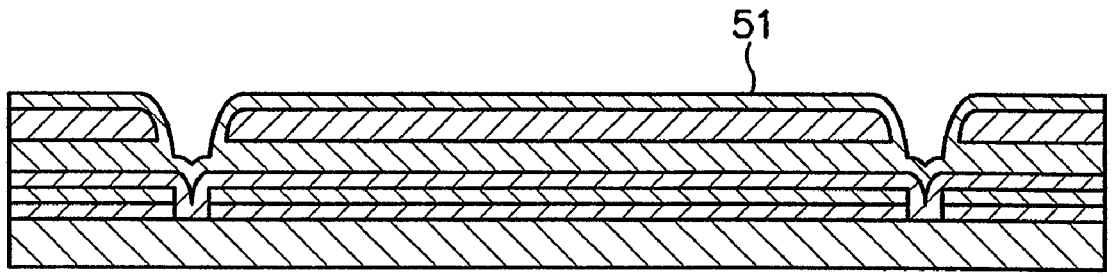
Figure 6F:
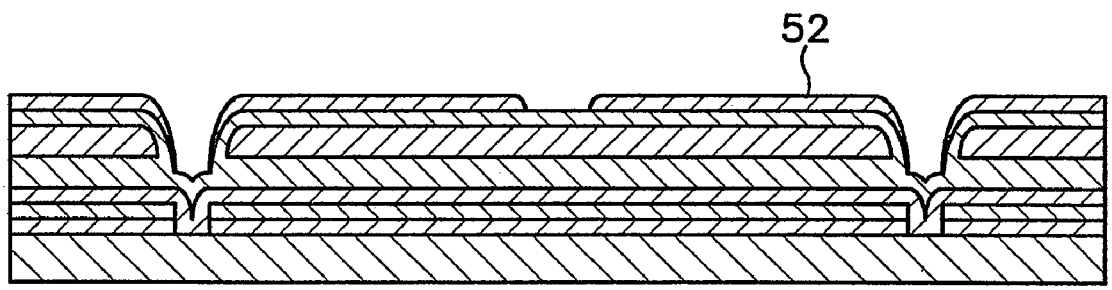
Figure 6G:
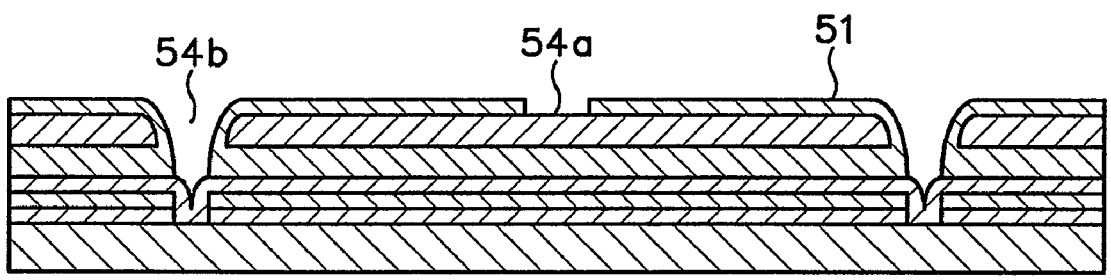

Returning to FIG. 6c, a photoresist layer 48 is deposited and patterned appropriately. The structure is then etched as dictated by the photoresist pattern, forming mirrors on top of sacrificial islands 50 as shown in FIG. 6d. A second sacrificial layer 51 is then deposited in FIG. 6e. Photoresist 52 is then applied to the second sacrificial layer and patterned in FIG. 6f. In FIG. 6g portions of the first, 46, and second, 51, sacrificial layers have been etched away to form locations such as 54b for support posts and 54a for supports, and the photoresist layer has been stripped away.

Figure 7A:
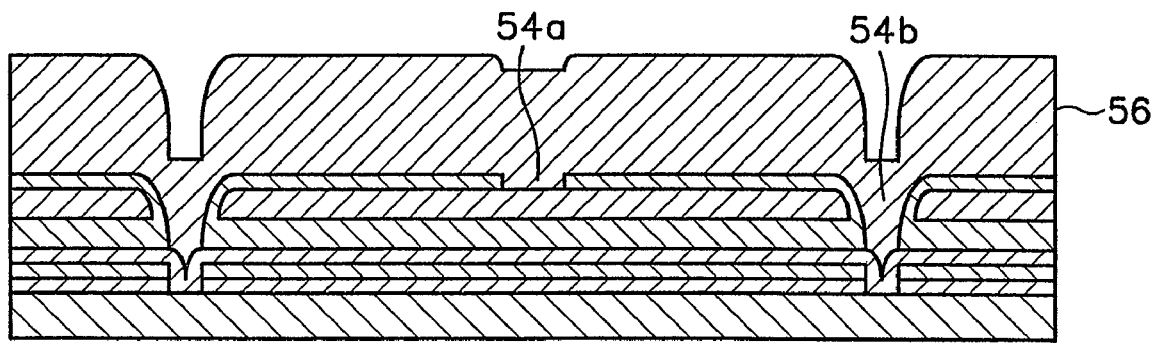
FIGS. 7a-7f show cross-sectional views of a modulator throughout the later steps of an embodiment of a process to manufacture interferometric modulators using a planarizing layer.
Figure 7B:
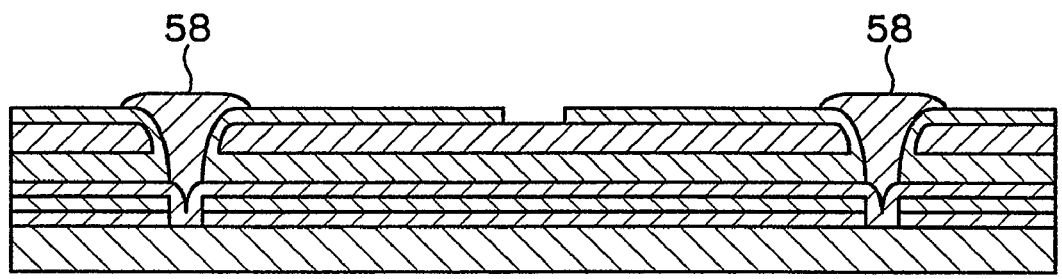
Figure 7C:
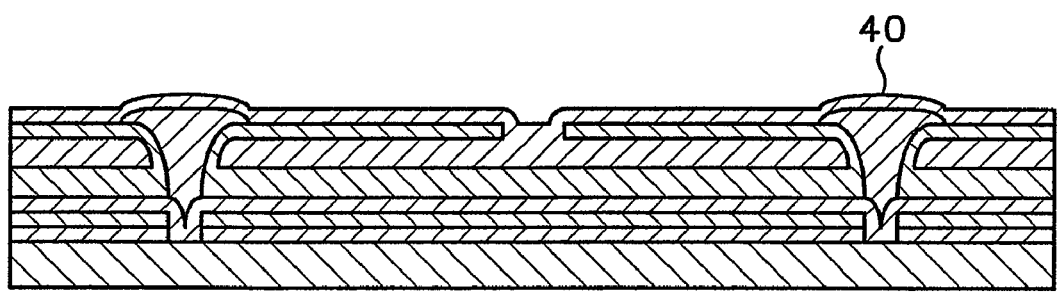

At this point in the process, the methods of manufacturing either modulator 100 from FIG. 3 or modulator 200 from FIG. 4 diverge. The modulator 200 of FIG. 4 having the support post plugs 42 has processes as shown in FIGS. 7a-7f. In FIG. 7a, the structure as shown in FIG. 6g has added to it a planarization layer 56. The planarizing material fills the locations 54a and 54b. The planarization material is partially removed as shown in FIG. 7b, forming support post plugs 58. The flex layer, which may also be referred to as the mechanical layer 40 is then applied over the support post plugs in FIG. 7c.

Figure 7D:
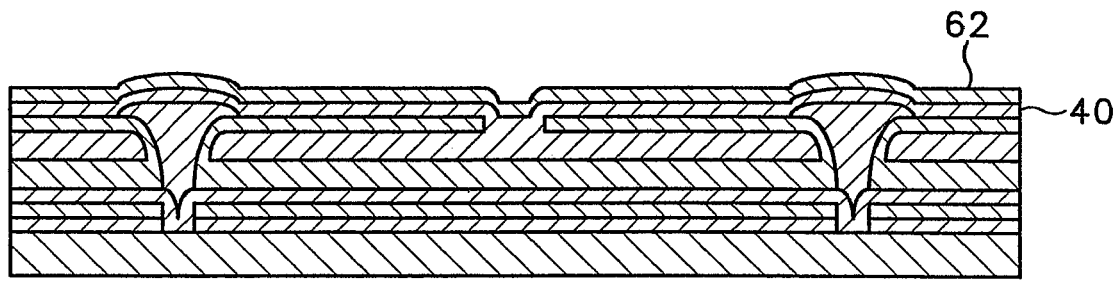
Figure 7E:
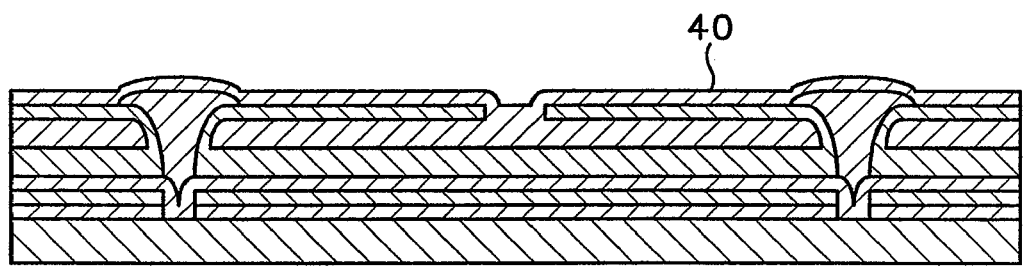
Figure 7F:
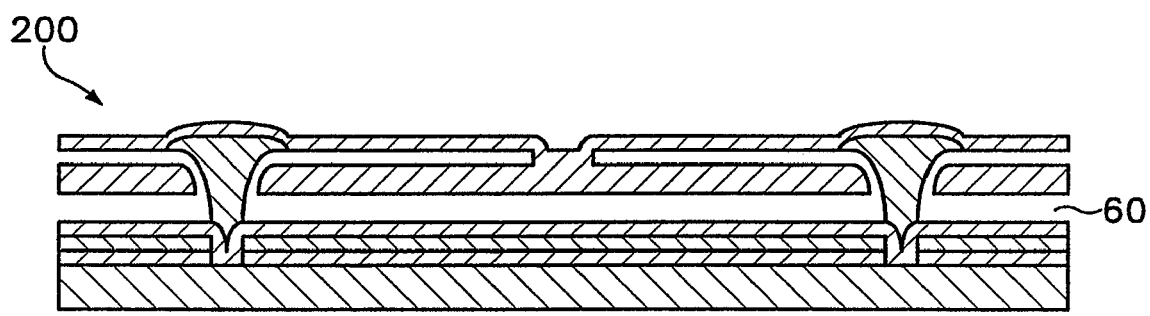

A photoresist layer 62 is applied and patterned in FIG. 7d. This is used as an etch mask to pattern the flex layer 40. In FIG. 7e, the flex layer 40 has been patterned. The effects of the patterning are not noticeable in the cross sectional view shown here. A back view of the modulator elements showing embodiments of the flex layer patterning will be discussed with regards to FIGS. 10a and 10b. Finally, if no bussing layer is to be used, the sacrificial layers are removed, typically by plasma etch, in FIG. 7f. The resulting modulator 200 has a cavity 60, in which the mirror is suspended over the optical stack.

Figure 8A:
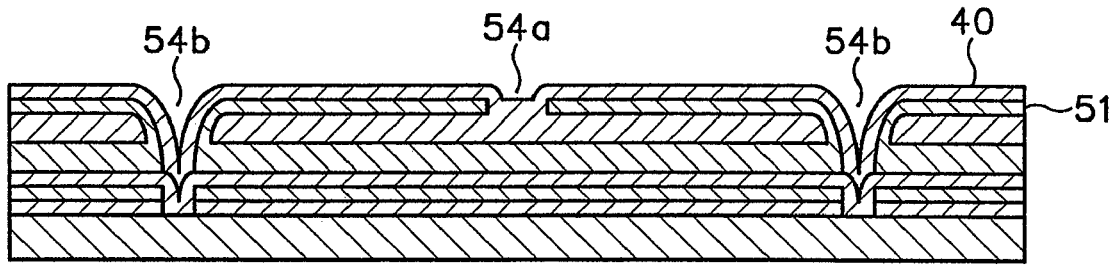
FIGS. 8a-8d show cross-sectional views of a modulator throughout the later steps of an embodiment of a process to manufacture interferometric modulators without a planarizing layer.

Returning to FIG. 6g, the processing for the modulator 100 will now be discussed. Instead of applying a planarizing layer as discussed in FIG. 7a, the metal layer 40 is applied directly to the second sacrificial layer 51 and locations 54a and 54b, as is shown in FIG. 8a. This causes the flex layer to form the support posts, where it fills locations 54b and to form the back supports where it fills locations such as 54a. This approach has the advantage of eliminating the planarization process, which may simplify both the manufacturing process and the resultant structure.

Figure 8B:
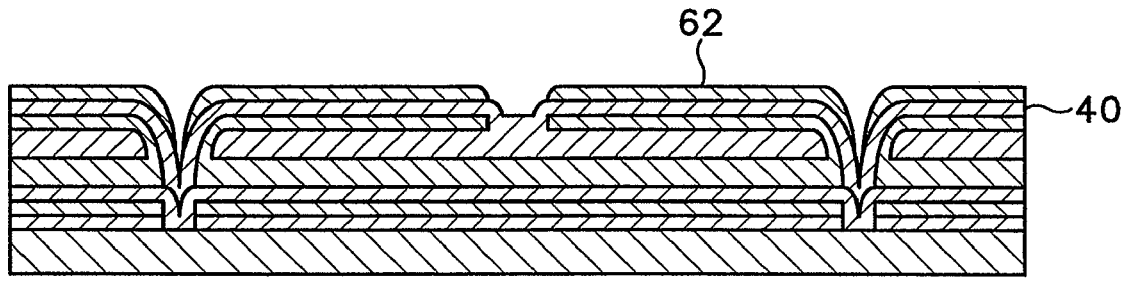
Figure 8C:
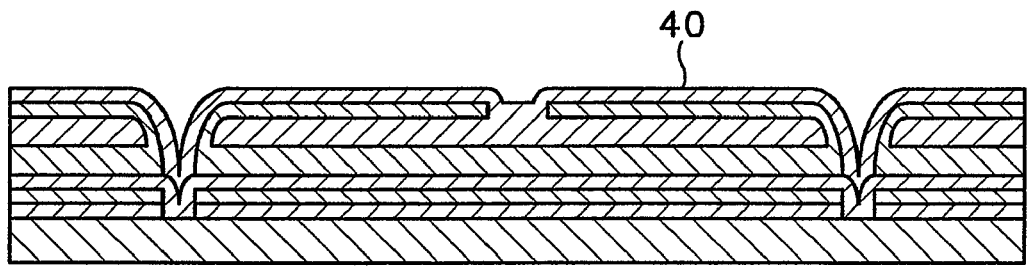
Figure 8D:
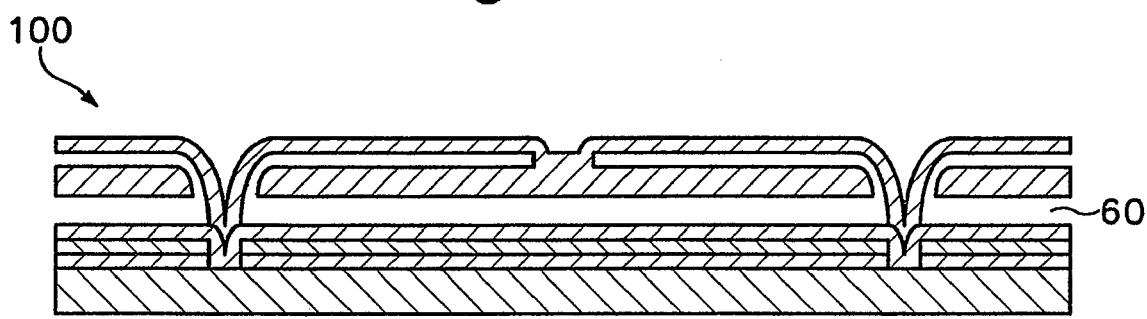

Once the flex layer 40 is applied, a photoresist 62 is used to pattern the flex layer 40, as shown in FIG. 8b. In FIG. 5c, while not discernable from this view, the flex layer 40 has been patterned to create the unique mechanical properties of the modulator that will be discussed further. Finally, in FIG. 8d the sacrificial layers have been removed, forming the cavity 60 in modulator 100. In this embodiment, no back bussing structure was used.

Figure 9A:
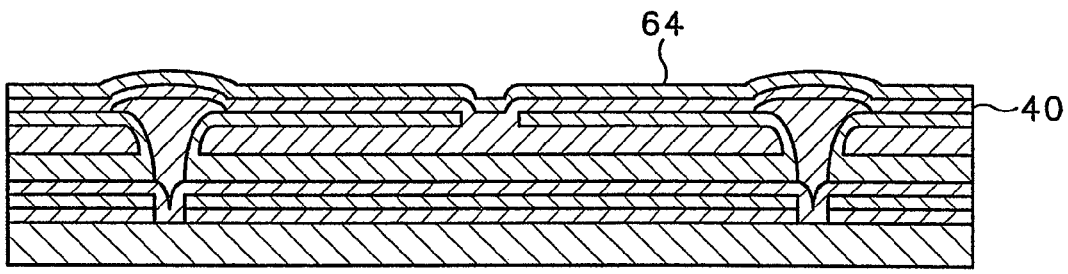
FIGS. 9a-9f show cross-sectional views of the later steps of a process to manufacture interferometric modulators having an address bussing behind a flex layer.
Figure 9B:
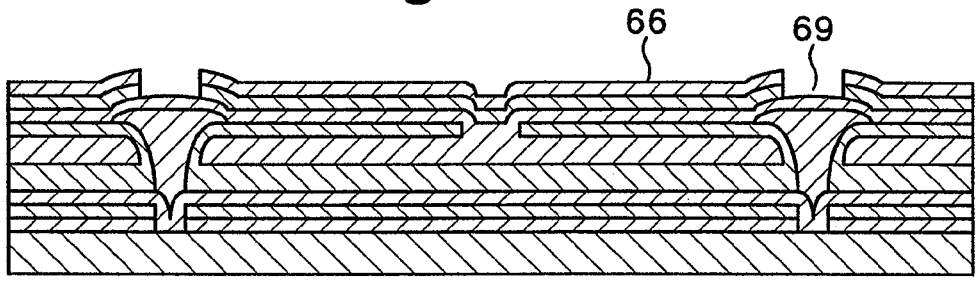
Figure 9C:
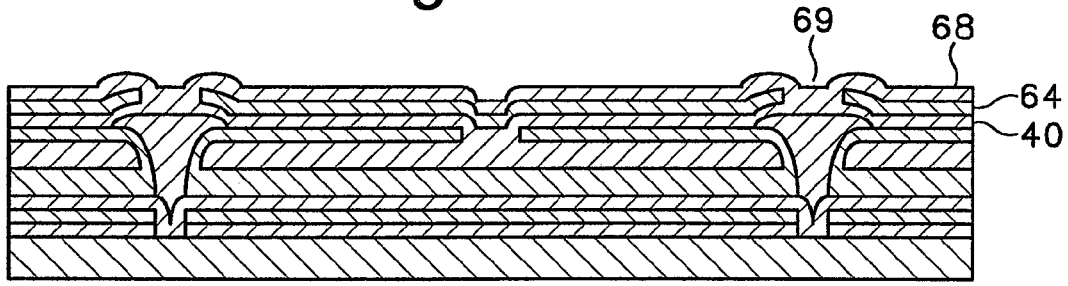

An example of the process flow for adding a back bussing structure is shown in FIGS. 9a-9c. The process shown begins with the structure formed in FIGS. 7e and 8c, after patterning of the flex layer, but prior to the removal of the sacrificial layers. For discussion purposes, the modulator configuration having the support post plugs as in FIG. 7e is used, but could be equally applicable to embodiments where no support post plug exists as in FIG. 8c.

In FIG. 9a, a third sacrificial layer 64 is applied to the flex layer 40. A photoresist layer 66 is applied in FIG. 9b. The photoresist layer is then patterned and the structure etched to form holes, such as 69. In FIG. 9c, a conductive bus layer 68 is applied providing contact between the bus layer 68 and the flex layer 40 through the hole 69. This provides electrical connection such that signals on the bus layer 68 can be used to control the flex layer 40.

Figure 9D:
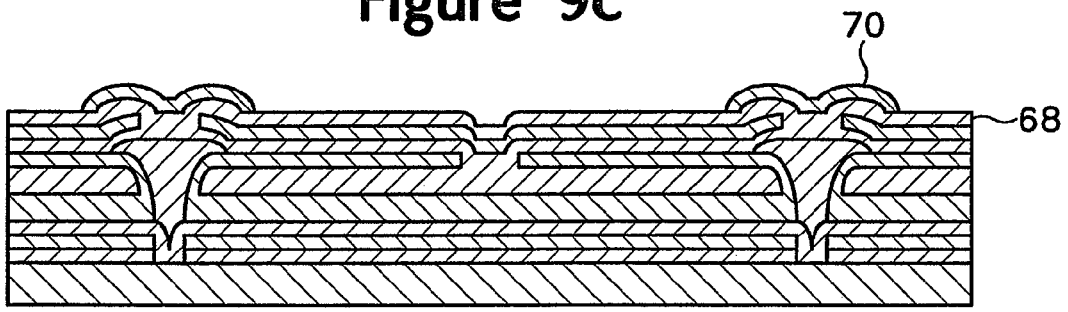
Figure 9E:
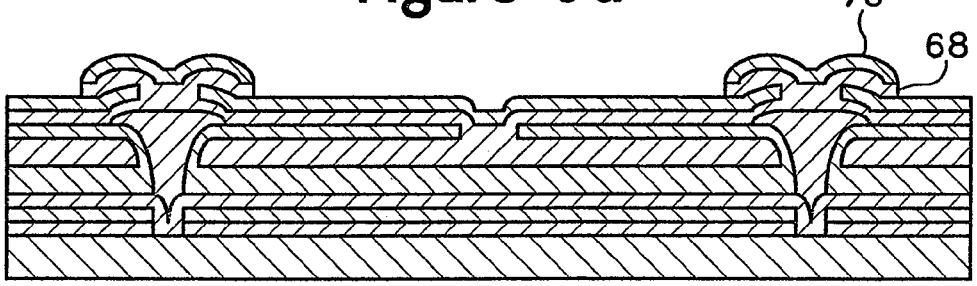
Figure 9F:
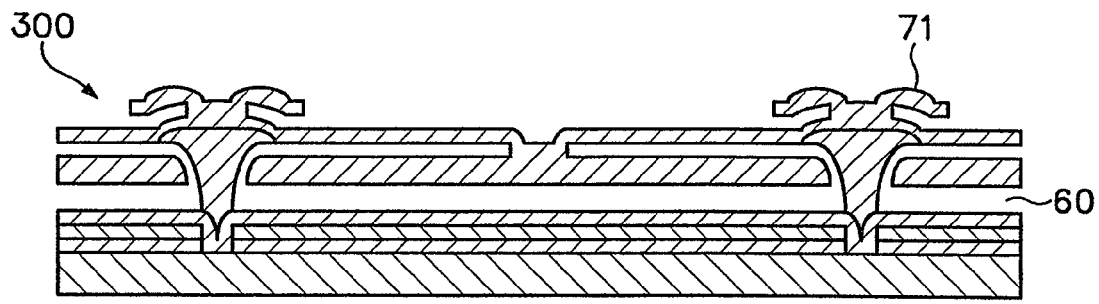

In FIG. 9d, a photoresist layer 70 is applied and patterned. In FIG. 9e, the bus layer 68 is patterned and etched or otherwise removed so that the remaining portions of the bus layer 68 form the bus structure 71 of FIG. 9f. In FIG. 9f, the sacrificial layers are also removed, resulting in modulator 300, having bus structure 71 and cavity 60.

The bus structure is possible because of the optical shielding provided by the mirror between the viewing side of the substrate and the back of the flex layer. This provides the ability to separate the optical and the electromechanical properties of the modulator. The optical properties, improved by the use of the suspended mirror 38 in any of the embodiments, are separated from the electromechanical properties such as addressing and the movements that result from that addressing. This separable modulator architecture allows more freedom in the use of the back of the modulator, as it prevents any processes performed on the back of the flex membrane or structures added from affecting the optical performance of the modulator.

Figure 10A:
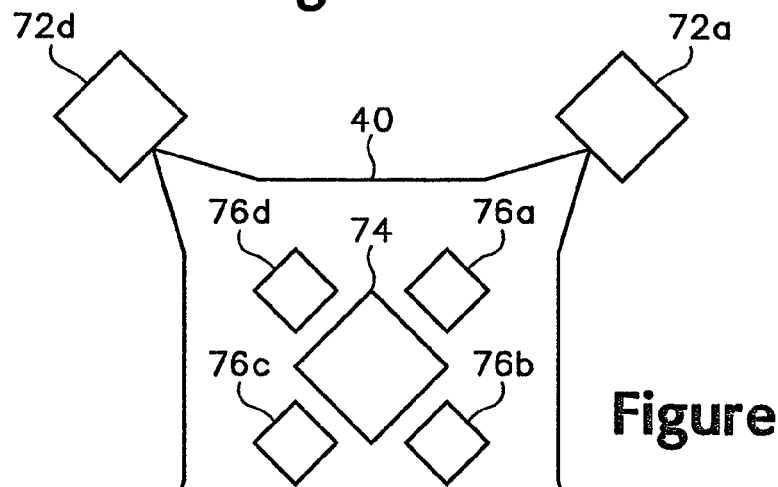
FIGS. 10a and 10b show alternative embodiments of back plane supports for a separable interferometric modulator.
Figure 10B:
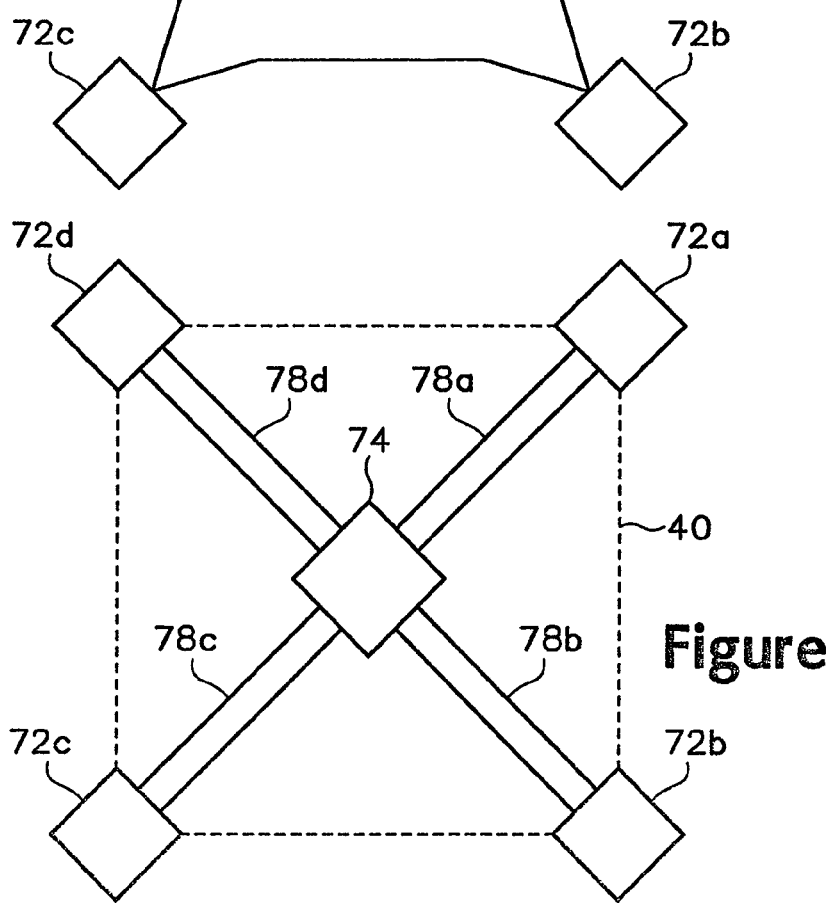

Possible patterns used on the back of the flex membrane 40 are shown in FIGS. 10a and 10b. These views are from the back of the modulator, which may also be seen as the top of the modulators shown in the previous figures. In FIG. 10a, the sacrificial layer 52 was patterned to form the large center back support 74 surrounded by four small supports 76a-d that were subsequently filled in by flex layer 40. The layer 40 would only be patterned and removed from the edges of the membrane to separate it from the adjacent modulator elements, otherwise suspending the mirror from the support posts 72a-72b.

Alternatively, in FIG. 10b, the flex layer is patterned to form thin, linear straps 78a-d connected to each support post 72a-d. The straps are attached to the mirror by center support 74. These two alternatives, among many others, may affect the freedom of movement of the mirror and the detailed mechanical characteristics of that movement. In some cases, this may be an advantage.

For example, in the color modulator example given above, three masking and depositing processes were needed to form three different cavity depths. As an alternative, the detailed mechanical characteristics of the flexible layer, the support structure, and the interface between the flex layer and the support posts can be altered by the various design and process parameters. This allows the same depth cavity to be used for pixels of different colors. The various design parameters modify the quiescent position of the mirror within the cavity upon removal of the sacrificial layers.

Figure 11A:
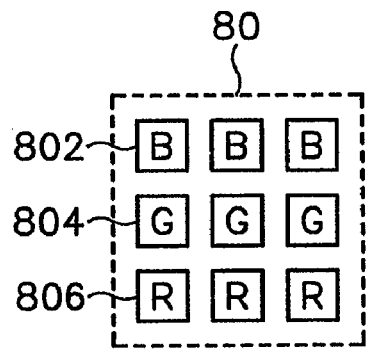
FIGS. 11a-11d show layouts and cross-sectional views of alternative embodiments of interferometric modulators in which pixel color may be controlled by flexible layer properties.
Figure 11B:
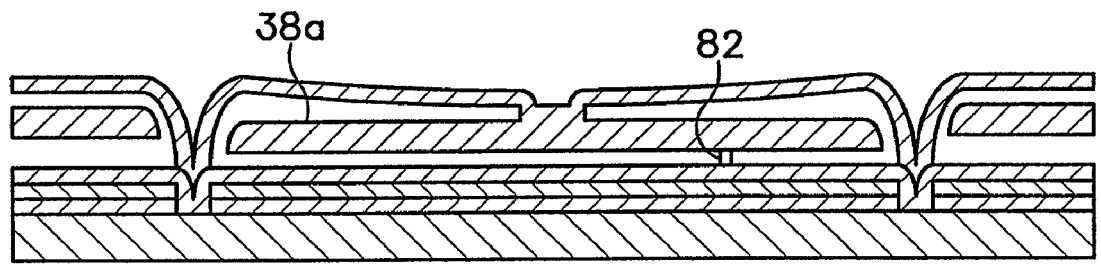
Figure 11C:
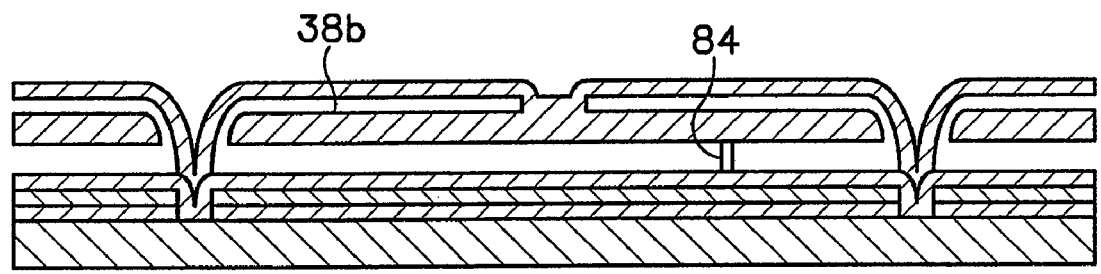
Figure 11D:
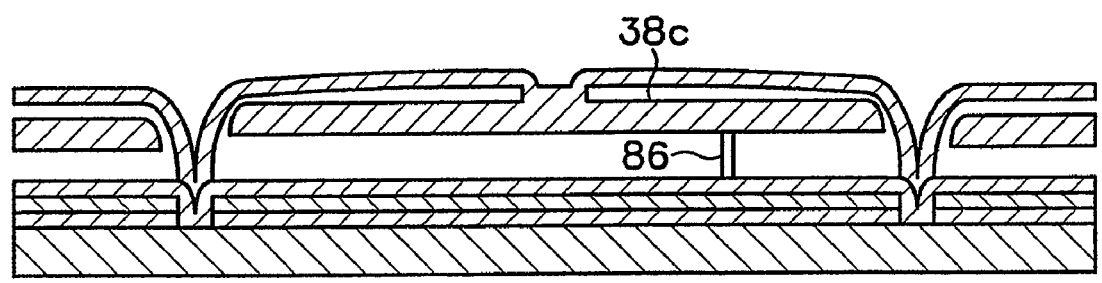

One possible pixel configuration 80 is shown in FIG. 11a. This view is as seen by the viewer from the front surface of the substrate, and is comprised of nine elements, three for each of the colors red, green and blue. The modulator 802 may correspond to blue, 804 to green and 806 to red, as shown. These three different colors may be achieved by varying the distance between the mirror and the optical stack. When a voltage is applied to the modulators, they may all move a uniform distance towards the electrode or they may all move different distances toward the electrode. Indeed, all three modulators may traverse the entire cavity and move to a near position that brings them into direct contact with the substrate. The dimensions of the cavities in the quiescent state are shown by the vertical dimensions 82, 84 and 86, in FIGS. 11b, 11c and 11d, respectively.

For example, one mirror 38a of one modulator corresponding to one color of the resulting pixel may have back supports, a flex layer and support post interfaces designed to cause the mirror to settle at a distance 82, smaller than the as-fabricated sacrificial layer. A second mirror 38b of one modulator corresponding to another color may have back supports, a flex layer, and support post interfaces designed to cause the mirror to settle at the as-fabricated thickness 84 of the sacrificial layer, after the sacrificial layer is removed. Finally, a third mirror 38c of another modulator corresponding to yet another color may have back supports, a flex layer and support post interfaces designed to cause the mirror to settle at a distance 86 larger than the as-fabricated thickness of the sacrificial layer, after removal of the sacrificial layer. In this way, controlling the mechanical properties and/or the physical restraints of the supports result in three different cavity dimensions, and thus three different pixel colors are created using a single thickness of sacrificial material.

Alternatively, the modulators could all be released from the sacrificial layers and all stay at the same position. The differing characteristics of the flex layer and supports could be manipulated to cause the mirrors to move different distances upon application of the same voltage. As yet another alternative, the modulators could all have the same structures, but differing voltages applied for differing colors.

In addition to the freedom afforded by separating the electromechanical properties of the modulator from the optical properties, a suspended mirror provides other opportunities. As was discussed above, the suspended mirror alleviates objectionable artifacts that may occur due to the curvature of the membrane. As discussed above, a black state for the pixels can be achieved by deflecting the mirror very close to or into direct contact with the optical stack on the front surface of the cavity. Both of these methods of achieving a dark state can have drawbacks. Holding an array of mirrors at a very small gap electrostatically can require the modulator to be constructed with incredibly high precision. Allowing the mirror to come into direct contact with the optical stack prevents the designer from using certain incompatible combinations of mirror/optical stack materials.

Figure 12A:
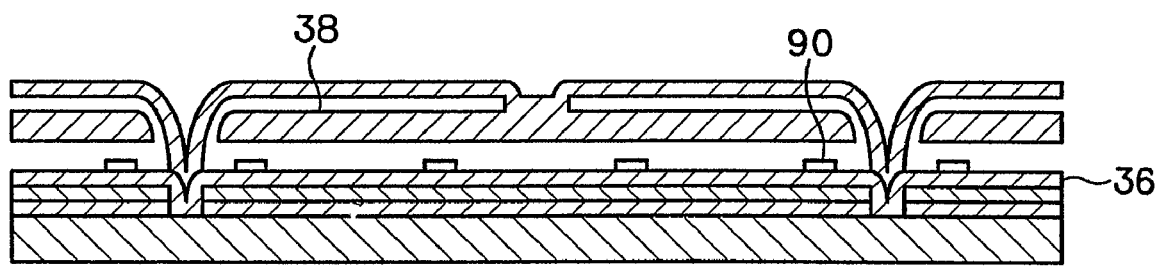
FIGS. 12a and 12b show cross-sectional views of embodiments of interferometric modulators in which landing pads are used to modify the electromechanical properties of the moving mirror and flexible layers.

In order to remove these limitations it is possible to fabricate on top of the oxide layer 36 an arrangement of small landing pads 90 as shown in FIG. 12a applied to modulator 100. Such landing pads can be constructed of common thin-film-process-compatible material using the same deposition and lithography techniques used for the other layers of the iMoD. These landing pads can be small enough so as to be essentially invisible to the human eye while being distributed across the front face of the entire cavity so as to affect operation of the entire mirror 38.

Several different purposes can be achieved with these landing pads. Landing pads can allow complete freedom in the choice of the optical stack material, since the landing pads prevent the mirror 38 from contacting the oxide layer 36. Indeed, insulating landing pads 90 would in principle allow the top layer of the optical stack to be a conductor rather than an insulator. Landing pads can change the mechanical operation of the iMoD by changing the electric field distribution in the cavity. Landing pads can enable a dual mode sort of operation in which the mirror 38 stays flat until it hits the landing pads and then, with increasing voltage, bends as would a membrane to allow each pixel to achieve multiple, precise color values.

Figure 12B:
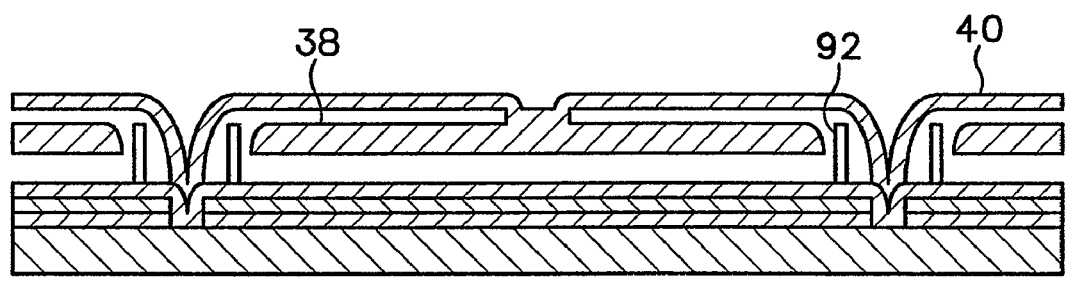

A second landing pad configuration is shown in FIG. 12b in which the flex layer 40, rather than the mirror 38, contacts the landing pad 92. In this manner, the modulator has two separate ranges of mechanical behavior, one before the flex layer contacts the landing pad and one after. This allows multiple colors per pixel to be achieved with precise uniformity set by the thickness of the landing pads 92.

In this manner, the manufacture and operation of interferometric modulators may be improved. The suspended mirror increases the usable active area for creating a resulting pixel in the image and eliminates many possible objectionable artifacts. The support structure attaching to the mirror on the back side also provides more freedom in the manufacturing process. Interconnections enabled by the back support may also result in fewer electrodes having to be deposited on the glass, resulting in more available glass area. The separation of the optical properties from the electromechanical properties may result in previously unavailable opportunities, due to the separation of the flex membrane from the optical properties of the modulator.

Thus, although there has been described to this point a particular embodiment for a method and apparatus for interferometric modulators and their methods of manufacture, it is not intended that such specific references be considered as limitations upon the scope of this invention except in-so-far as set forth in the following claims.

What is claimed is:

1. A device comprising at least one light modulator, the light modulator comprising:
   an electrode layer located over a substrate;
   an optical stack located over the substrate;
   a movable minor spaced apart from the electrode layer and optical stack by a cavity, said movable minor having a reflective surface facing the cavity; and
   a flexible layer located over the movable minor and supporting the movable minor, wherein a portion of the flexible layer overlying the movable minor is spaced apart from a portion of the movable mirror by a gap.

2. The device of claim 1, additionally comprising a plurality of support posts located over the substrate, wherein the flexible layer is supported by said plurality of support posts.

3. The device of claim 2, wherein the plurality of support posts comprise a portion of the flexible layer.

4. The device of claim 2, additionally comprising at least one bus structure located over at least one of the plurality of support posts.

5. The device of claim 2, wherein the plurality of support posts comprise a planarizing material.

6. The device of claim 1, wherein the flexible layer is in contact with the movable minor at more than one location.

7. The device of claim 1, additionally comprising at least one landing pad arranged between the minor and the optical stack, wherein the landing pad comprises an insulating material.

8. The device of claim 7, wherein the landing pad is located on the 1/2 optical stack and configured to contact the minor.

9. The device of claim 7, wherein the landing pad is located on the optical stack and configured to contact the flexible layer.

10. The device of claim 1, wherein the optical stack comprises a metal layer.

11. The device of claim 1, wherein the device comprises at least two interferometric modulators, wherein a first modulator corresponding to a first color comprises a cavity having a first dimension, and wherein a second modulator corresponding to a second color comprises a cavity having a second dimension, said first and second dimensions being different.

12. The device of claim 11, wherein the device comprises at least a third interferometric modulator corresponding to a third color and comprising a cavity having a third dimension, said third dimension being different from said first and second dimensions.

13. A method of manufacturing a light modulating device, comprising:
   forming an electrode layer over a substrate;
   forming an optical stack over the substrate;
   depositing a first sacrificial layer over the electrode layer and optical stack;
   forming at least one mirror over the first sacrificial layer;
   depositing a second sacrificial layer over the mirror layer;
   forming a flexible layer over the second sacrificial layer; and
   removing the sacrificial layers.

14. The method of claim 13, additionally comprising patterning at least said first and second sacrificial layers to form a plurality of post holes.

15. The method of claim 14, wherein forming the flexible layer comprises:
  depositing a flexible layer over the second sacrificial layer; and
  patterning and etching the sacrificial layer to form a plurality of supports.

16. The method of claim 15, wherein the plurality of supports have predetermined mechanical properties such that the mirror assumes a quiescent state at a predetermined vertical position from the electrode layer and optical stack.

17. The method of claim 15, wherein the plurality of supports have predetermined physical restraints that cause the mirror to move to a predetermined position relative to the electrode layer and optical stack upon application of a constant voltage.

18. The method of claim 14, additionally comprising:
  depositing a layer of planarizing material prior to deposition of the flexible layer; and
  partially removing the planarizing material to form a plurality of support posts.

19. The method of claim 18, wherein forming a flexible layer over the second sacrificial layer comprises forming a flexible layer over the plurality of support posts.

20. The method of claim 14, additionally comprising:
  depositing a third sacrificial layer over the flexible layer; and
  forming at least one bus structure over at least one of the plurality of post holes.

21. The method of claim 20, wherein forming at least one bus structure over at least one of the plurality of post holes comprises:
  patterning the third sacrificial layer to form a hole located over at least one of the plurality of post holes;
  depositing a conductive bus layer over the third sacrificial layer, such that the conductive bus layer fills the hole in the third sacrificial layer; and
  patterning the conductive bus layer to form at least one bus structure over at least one of the plurality of post holes.

22. The method of claim 13, additionally comprising forming at least one landing pad over the optical stack.

23. The method of claim 13, wherein the optical stack comprises a metal layer.

24. The method of claim 13, wherein depositing a first sacrificial layer comprises depositing a first sacrificial layer having multiple thicknesses.

25. The method of claim 24, wherein the first sacrificial layer comprises a first portion having a first thickness, a second portion having a second thickness, and a third portion having a third thickness, and wherein at least one minor is located over each of said first, second, and third portions.

26. The method of claim 25, wherein each minor corresponds to an interferometric modulator, and wherein the thickness of the portions of the first sacrificial layer underneath the minors determines the colors reflected by the corresponding modulators.

27. A light modulator, comprising:
  means for conducting an electrical signal, wherein the conducting means comprise an electrode layer formed over a substrate;
  first means for reflecting light operable in response to the conducting means, wherein the first reflecting means comprise a movable mirror;
  second means for reflecting at least a portion of the light incident upon said second reflecting means, said second reflecting means are substantially parallel to said first reflecting means, wherein said second reflecting means comprise an optical stack formed over a substrate; and
  means for suspending said first reflecting means, wherein a portion of the suspending means is spaced apart from a portion of the first reflecting means by a gap.

28. The light modulator of claim 27, wherein the suspending means comprise a flexible layer in contact with the first reflecting means.

29. The light modulator of claim 28, wherein the suspending means additionally comprise a plurality of support posts.

* * * * *

UNITED STATES PATENT AND TRADEMARK OFFICE
CERTIFICATE OF CORRECTION

| | | |
|---|---|---|
| PATENT NO. | : 7,672,035 B2 | Page 1 of 1 |
| APPLICATION NO. | : 12/325964 | |
| DATED | : March 2, 2010 | |
| INVENTOR(S) | : Jeffrey Brian Sampsell et al. | |

It is certified that error appears in the above-identified patent and that said Letters Patent is hereby corrected as shown below:

At Page 2, Column 2, Line 41, under Other Publications, change "11/686,414." to --11/868,414.--.

At Column 5, Line 34, change "5c," to --8c,--.

At Column 8, Line 12, in Claim 1, change "minor" to --mirror--.

At Column 8, Line 13, in Claim 1, change "minor" to --mirror--.

At Column 8, Line 15, in Claim 1, change "minor" to --mirror--.

At Column 8, Line 16, in Claim 1, change "minor" to --mirror--.

At Column 8, Line 17, in Claim 1, change "minor" to --mirror--.

At Column 8, Line 30, in Claim 6, change "minor" to --mirror--.

At Column 8, Line 32, in Claim 7, change "minor" to --mirror--.

At Column 8, Line 36, in Claim 8, before "optical" delete "1/2".

At Column 8, Line 36, in Claim 8, change "minor" to --mirror--.

At Column 10, Line 11, in Claim 25, change "minor" to --mirror--.

At Column 10, Line 13, in Claim 26, change "minor" to --mirror--.

At Column 10, Line 16, in Claim 26, change "minors" to --mirrors--.

Signed and Sealed this
Thirteenth Day of March, 2012

David J. Kappos
*Director of the United States Patent and Trademark Office*